United States Patent [19]

Sullivan et al.

[11] Patent Number: 5,078,942
[45] Date of Patent: Jan. 7, 1992

[54] COEXTRUSION METHOD AND APPARATUS

[75] Inventors: Dayrel E. Sullivan, Stonewall; Frank B. Ivy, Quitman, both of Miss.

[73] Assignee: Griffco Plastics, Inc., Atlanta, Ga.

[21] Appl. No.: 568,043

[22] Filed: Aug. 16, 1990

[51] Int. Cl.$^5$ .................... B29C 47/06; B29C 47/20
[52] U.S. Cl. .................... 264/173; 264/209.8; 425/133.1; 425/462
[58] Field of Search .................... 264/173, 209.8; 425/133.1, 380, 462

[56] References Cited

U.S. PATENT DOCUMENTS

| | | | |
|---|---|---|---|
| 3,099,860 | 8/1963 | Schippers | 264/209.8 |
| 3,223,761 | 12/1965 | Raley | 425/133.1 X |
| 3,266,093 | 8/1966 | Corbett | 425/133.1 |
| 3,419,938 | 1/1969 | Sonia et al. | 425/133.1 |
| 3,504,402 | 4/1970 | Wetz et al. | 425/131.1 |
| 3,716,612 | 2/1973 | Schrenk et al. | 264/241 |
| 3,924,990 | 12/1975 | Schrenk | 425/131.1 |
| 4,125,585 | 11/1978 | Rosenbaum | 264/173 |
| 4,362,488 | 12/1982 | Casals et al. | 425/133.1 X |
| 4,731,002 | 3/1988 | Spence et al. | 425/133.1 |
| 4,783,299 | 11/1988 | Prevotat | 264/173 |

*Primary Examiner*—Leo B. Tentoni
*Attorney, Agent, or Firm*—Hopkins & Thomas

[57] ABSTRACT

The present invention is an improved method and apparatus for the coextrusion of layered wall conduit wherein a flow of a first resin is advanced along a longitudinal axis and two flows of a second resin is advanced along paths that straddle the flow of first resin. The advancing flows of second resin are progressively spread into arcuate fanned shapes that extend about the flow of first resin until the edges of the fanned flows meet to form a first axially extending annular flow surrounding the flow of first resin. The flow of first resin is then shaped into a second axially extending annular flow that is inwardly concentric relative to the first annular flow and the first and second annular flows are moved into confluence to form a layered flow that is shaped in a sizing due into layered wall conduit. In one embodiment, a third outwardly concentric annular flow is moved into confluence with the layered flow forming a three-layer flow for shaping into conduit.

17 Claims, 4 Drawing Sheets

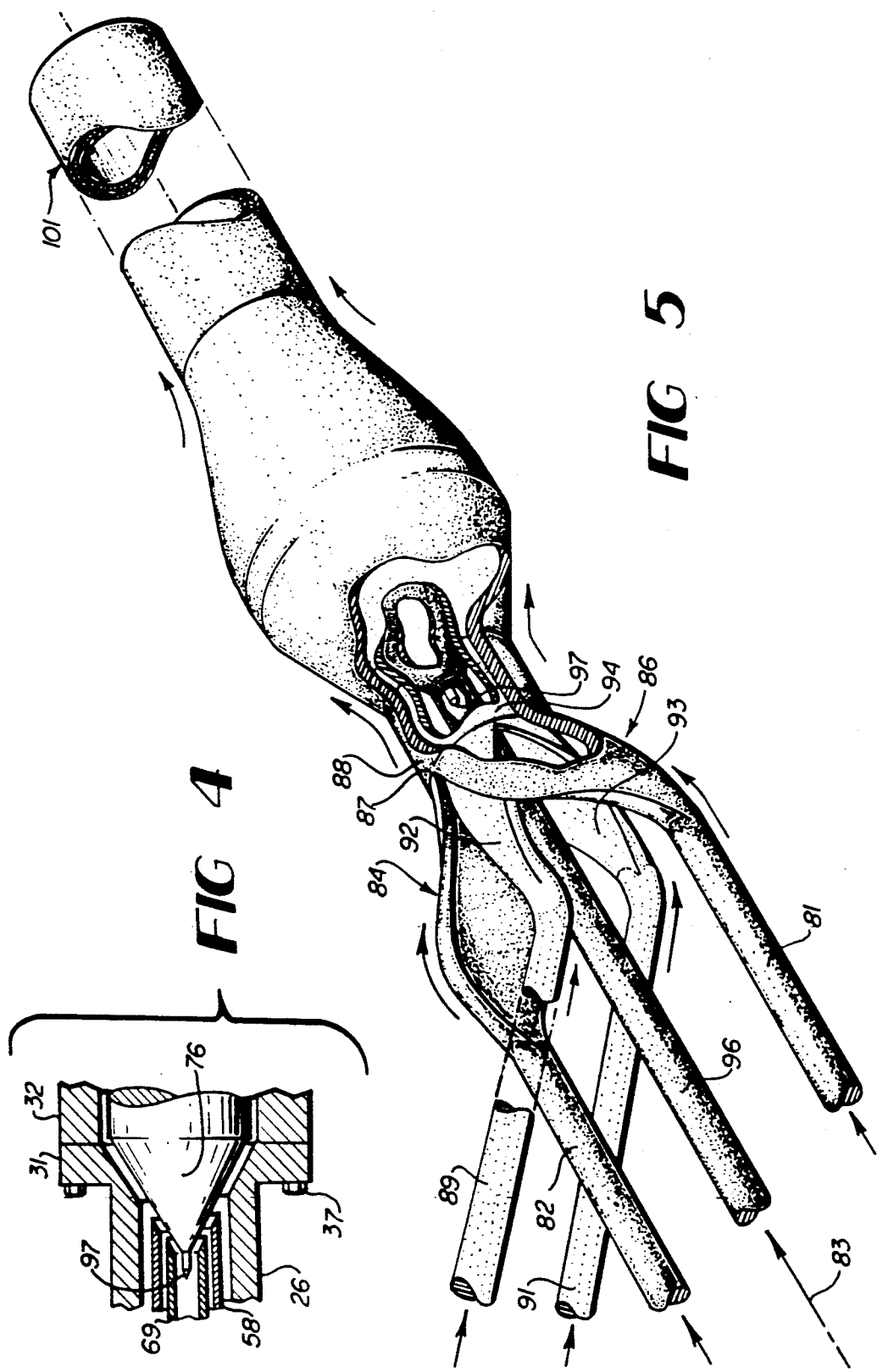

COEXTRUSION METHOD AND APPARATUS

TECHNICAL FIELD

This invention relates to plastic pipe extrusion and particularly to an improved method and apparatus for coextruding triple-wall conduit of the type having walls formed with an intermediate layer of a first synthetic resin sandwiched between inner and outer layers of a second synthetic resin.

BACKGROUND OF THE INVENTION

Conduit or pipe for transporting fluids, containing underground cables, and the like has for many years been extruded from synthetic resin such as poly-vinyl chloride (PVC). More recently, such pipe has been made lighter and more economically by forming its walls to have a layered construction with an intermediate layer of a relatively inexpensive foamed synthetic resin sandwiched between inner and outer walls of a more resilient and corrosion resistant resin. Such pipes are commonly referred to as triple-wall conduit.

A number of assemblies commonly known as coextrusion heads for extruding triple-wall conduit have been developed and employed in the pipe extrusion industry. Examples of such heads are disclosed in U.S. Pat. No. 4,125,585 of Rosenbaum, U.S. Pat. No. 4,731,002 of Spence, and U.S. Pat. No. 4,783,299 of Prevotat. These devices usually comprise a stainless steel or other metal body that defines a number of internal passageways. The passageways are configured to receive flows of malleable synthetic resin from external extruders, shape them into generally concentric annular shells as they move trough the head, and bring the shells into mutual confluence to define a triple-wall sandwiched flow. Once formed, the sandwiched flow typically passes from the coextrusion head into a conventional sizing die, which condenses the wall thickness and sizes the flow to a desired diameter forming the finished conduit.

While such devices have proven somewhat successful for production of coextruded triple-wall conduit, they nevertheless have been plagued with numerous problems and shortcomings inherent in their respective designs. In the Rosenbaum coextrusion head, for example, internal passageways exhibit numerous sharp turns, discontinuous junctions, and narrow portions that must be negotiated by the resin flows thereby introducing resistance to the flow and causing malformations in the resin.

Further, webs that support an internal spider and accommodate radially extending flow passageways are disposed in some of the flow paths of the prior art heads such that resin flowing through such flow paths must split, traverse the webs, and come back together at the trailing edges of the webs. Such flow splitting and recombination can introduce additional malformations and discontinuities in the resinous material of the flow.

In addition, radial passageways in Rosenbaum tend to intersect axial annular passageways at a single circumferential location such that resin moving into the annular passageway must first flow around its circumference before it can move axially therethrough. This tends to introduce even more malformations and discontinuities in the flow and ultimately in the finished conduit itself.

The Spence head, while offering some improvements over Rosenbaum, still has an internal spider supported in a flow passageway by radially extending webs and still has flow paths that exhibit sharp and discontinuous turns that must be negotiated by the resin flows. Many of the problems of Rosenbaum are therefore also inherent in the design of Spence. Other prior art coextrusion heads exhibit similar problems.

In addition to having the just described problems, prior art coextrusion heads also tend to be extremely difficult to disassemble and clean. This is because such disassembly must necessarily be carried out with resin in the passageways of the head. Obviously, the discontinuous passageways, internal spiders and their support webs greatly hinder disassembly since the resin extending through and around such structures tends to bind component parts of the head together.

Thus, a critical and heretofore unaddressed need exists for a coextrusion method and apparatus adapted for reliable production of consistently high quality triplewall conduit through minimization of resin flow resistance, elimination of sharp discontinuous passageway junctions, and elimination of spiders and their associated webs that obstruct flow passageways and degrade the continuity of resin flow therethrough. Such an apparatus should also be constructed for easy disassembly and cleaning when required, even with resin embedded in its flow passageways. It is to the provision of such a method and apparatus that the present invention is primarily directed.

SUMMARY OF THE INVENTION

The present invention is preferably embodied in a coextrusion head having a generally cylindrical outer body formed with a contoured interior surface. A pair of shaped elongated inserts are concentrically and coaxially nested within the outer body. The surfaces of the inserts and the interior surface of the outer body together define outer, intermediate, and inner passageways through the extrusion head from an upstream end of the head to the downstream end thereof.

The upstream end of the outer passageway terminates in a pair of diametrically opposed circular inlet ports for receiving a pair of cylindrical resin flows from a resin distribution manifold. A respective one of a pair of opposed legs of the outer passageway extends toward the downstream end of the head from each inlet port with the legs each diverging and spreading about a circumference from its inlet port toward the downstream end of the head. At a predetermined position, the edges of the opposed spreading passageways merge to form an axially extending annular portion of the passageway, which extends to the downstream end of the coextrusion head.

The intermediate passageway has the same configuration as the outer passageway with a pair of opposed legs that diverge and spread from respective inlet ports until they merge into an annular portion that is inwardly concentric relative to the annular portion of the outer passageway. The inner passageway is defined by an axially extending bore that receives resin from the resin distribution manifold at the upstream end of the coextrusion head and transports it to the downstream end thereof.

The downstream end of the outer body and nested inserts are formed to define a conically shaped cavity that extends inwardly from the end of the coextrusion head. The cavity is shaped and sized to receive the cone-shaped torpedo of a conventional sizing die with the tip of the torpedo extending partially into the end of the inner passageway and with the conical surface of the torpedo spaced from and defining a conically expanding passageway with the walls of the conical cavity. With this configuration, the inner passageway communicates with the conical passageway at its apex while the intermediate and inner passageways communicate with the conical passageway at successive axial locations therealong.

In use, an first external extruder injects malleable synthetic resin for the outer and inner walls of the conduit into a resin distribution manifold and a second external extruder injects malleable foamed resin for the sandwiched intermediate layer of the conduit walls into the resin distribution manifold. The resin distribution manifold is formed with interior channels that develop the resin flow from the first extruder into three collinear cylindrical flows. The two outer flows of the triplet are delivered to the opposed inlet ports of the outer passageway of the coextrusion head while the center flow is delivered to the inner passageway of the coextrusion head. Similarly, resin from the second extruder is developed in the distribution manifold into a pair of cylindrical flows that are delivered to the inlet ports of the intermediate passageway of the coextrusion head.

The opposed legs of the outer and intermediate passageways in the coextrusion head diverge and spread their respective resin flows about a circumference as the resin moves therethrough until the edges of each flow merge into an axially extending annular configuration with the intermediate flow being inwardly concentric relative to the outer flow. The inner resin flow simply passes through the inner passageway of the coextrusion head from its upstream end toward its downstream end. As the three flows approach the downstream end of the head and the torpedo of the sizing die, the inner flow is pierced and parted by the tip of the torpedo such that the inner flow is formed into an annular configuration that is inwardly concentric relative to the intermediate and outer flows. Thus, the resin approaches the downstream end of the coextrusion head in the form of three concentric axially extending annular flows with the inner and outer flows being composed of the first synthetic resin, which is preferably resilient and corrosion resistant, and with the intermediate flow being composed of the second synthetic resin, which is preferably a foamed resin.

From the extrusion head, the three annular flows of resin move sequentially into the conically expanding passageway defined by the spaced surfaces of the torpedo and conically shaped cavity of the head. Specifically, the inner resin flow moves into the passageway adjacent the apex of the torpedo and begins to expand in a cone-shaped configuration therealong. As this inner flow expands, it meets the intermediate resin flow that is also moving into the cone-shaped passageway such that resin of the intermediate flow moves into confluence with resin of the first flow with the resulting layered flow expanding further along the passageway.

Finally, the layered flow meets the outer resin flow that is moving into the conical passageway from the outer annular passageway and the outer resin flow moves into the confluence with the expanding layered flow. The three layered flow, comprising a layer of foamed resin from the intermediate flow sandwiched between inner and outer layers of resin from the inner and outer flows, then expands further along the conical passageway until it is delivered to the sizing die for final sizing and delivery from the machine.

Thus it is seen that a coextrusion method and apparatus is now provided that overcomes problems and shortcomings inherent in the prior art by eliminating discontinuities and discontinuous junctions in resin flow through the apparatus and by eliminating obstructions in flow passageways that can degrade the quality of extruded conduit. Specifically, wherein resin flows through prior art devices must traverse through passageway junctions and discontinuous intersections as well as around passageway obstructions such as supporting webs, flows through the coextrusion head of the present invention move always axially from one end of the extrusion head to the other and simply diverge and spread about a circumference as they traverse the head to form concentric annular flows. No obstructions are disposed within flow passageways such that flow continuity is maintained throughout the length of the head.

The result is a more reliable and economical coextrusion process that produces a triple-wall conduit with superior resin distribution and continuity as well as increased strength and integrity. In addition, the head of this invention is inherently easily to disassemble for cleaning even with embedded resin in its passageways since there are no discontinuities or obstructions in the head to be encased by or embedded within the resin. These and many other objects, features and advantages inherent in the present invention will become more apparent upon review of the detailed description set forth hereinbelow taken in conjunction with the accompanying drawings.

BRIEF DESCRIPTION OF THE DRAWINGS

FIG. 4 is a cross-sectional view of the downstream end of the coextrusion head and torpedo showing annular passageways merging into the conically expanding passageway at successive locations therealong.

FIG. 5 is a partially sectional perspective view illustrating paths of resin flow through the resin distribution manifold, coextrusion head, and sizing die of the present invention.

DETAILED DESCRIPTION OF THE PREFERRED EMBODIMENT

Figure 1:
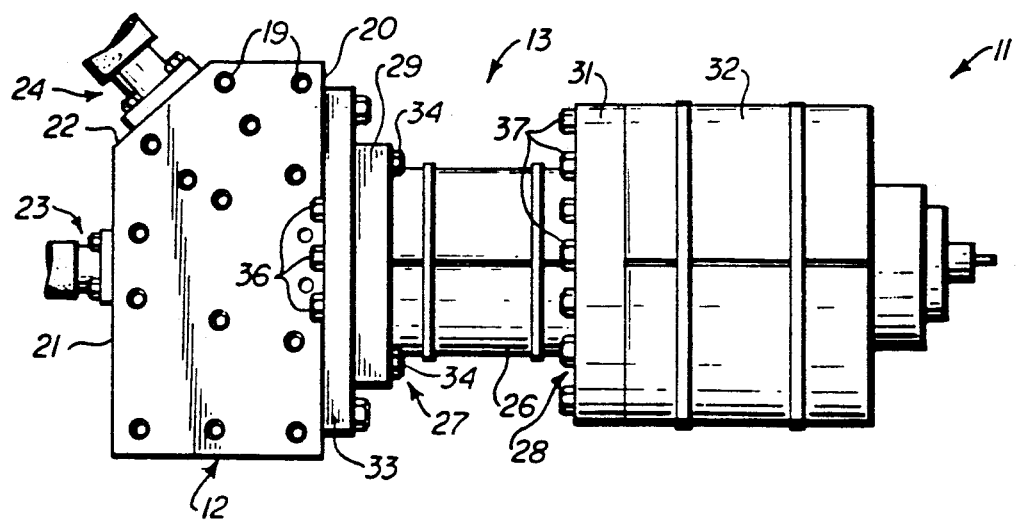
FIG. 1 is a top plan view of a triple-wall coextrusion head, resin distribution manifold, and sizing die assembly that embodies principles of the invention in a preferred form.
Figure 2:
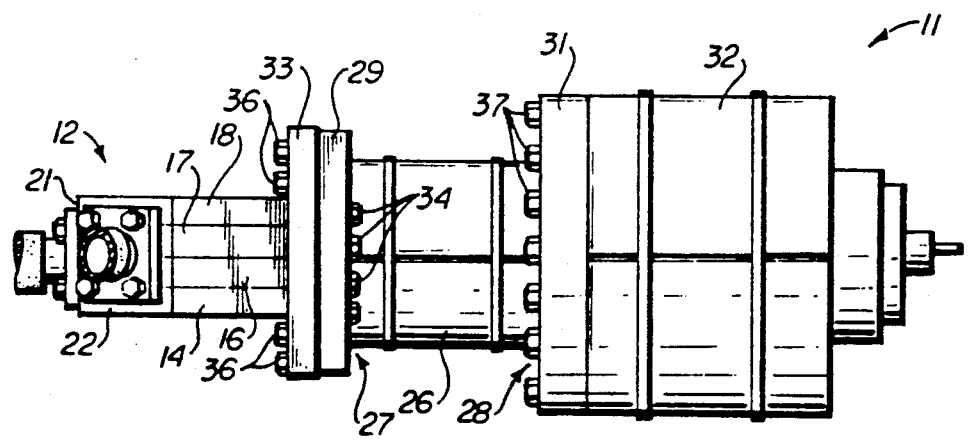
FIG. 2 is a side elevational view of the assembly of FIG. 1.

Referring now in more detail to the drawings, in which like numerals refer to like parts throughout the several views, FIGS. 1 and 2 illustrate a triple-wall conduit coextrusion apparatus 11 that embodies principles of the present invention in a preferred form. The apparatus 11 is seen to include a resin distribution manifold 12 that receives malleable synthetic resin from external extruders (not shown) and forms the resin into flows that are directed to a coextrusion head 13 for extrusion. More specifically, the distribution manifold 12 has a substantially rectangular block shaped body that is comprised of four overlying plates 14, 16, 17 and 18 with the plates being secured tightly together by means of bolts 19. The manifold 12 has a front face 20, a rear face 21 and an obliquely oriented side face 22 that is contiguous at one end with the rear face 21. As detailed below, the distribution manifold is formed with an array of resin channels that communicate with the rear and side faces of the manifold and with the front face thereof for delivery of resin to the extrusion head.

A first extruder adaptor 23 is mounted to the rear face 21 of the manifold 12 and a second extruder adaptor 24 is mounted to the obliquely oriented side face 22 of the manifold. The adapters 23 and 24 are configured to mate and communicate with the outlets of respective ancillary synthetic resin extruders for delivery of malleable synthetic resin to the distribution channels of the manifold 12. In the preferred embodiment, foamed synthetic resin for the sandwiched intermediate layer of the finished conduit wall is delivered through the oblique face adaptor 24 while synthetic resin for the resilient corrosion resistant outer and inner walls of the conduit is delivered through the rear face adaptor 23.

The coextrusion head 13 comprises a generally cylindrical body 26 having an upstream end 27 and a downstream end 28. The upstream end 27 is formed with an annular flange 29 for securing the head 13 to the front face of the distribution manifold 12. Similarly, the downstream end 28 of the head 13 is formed with an annular flange 31 for securing the head to a conventional sizing die 32 for final sizing and processing of resin flows into finished conduit.

An adaptor plate 33 is disposed between the distribution manifold 12 and the flange 29 of the coextrusion head 13 to provide for a tightly sealed interface between the manifold and the head. In this regard, a set of bolts 34 extend through the flange 29 and through the adaptor plate 33 to thread into corresponding threaded holes of plates 14 through 18 to draw the flange 29, plate 33 and block 12 tightly together. A second set of bolts 36 extend through the adaptor plate 33 and are secured within threaded holes of the flange 29 to draw the upper and lower portions of the flange 29 tightly against the plate 33.

With this configuration, the plate 33 is held tightly sandwiched between the coextrusion head 13 and the manifold 12 such that resin can flow from the manifold, through the plate, and into the coextrusion head without leaking at intervening junctions. A set of bolts 37 extend through the flange 31 at the downstream end of the head and are secured within corresponding threaded bores of the sizing die 32 to mount the head 13 tightly to the die 32.

Figure 3A:
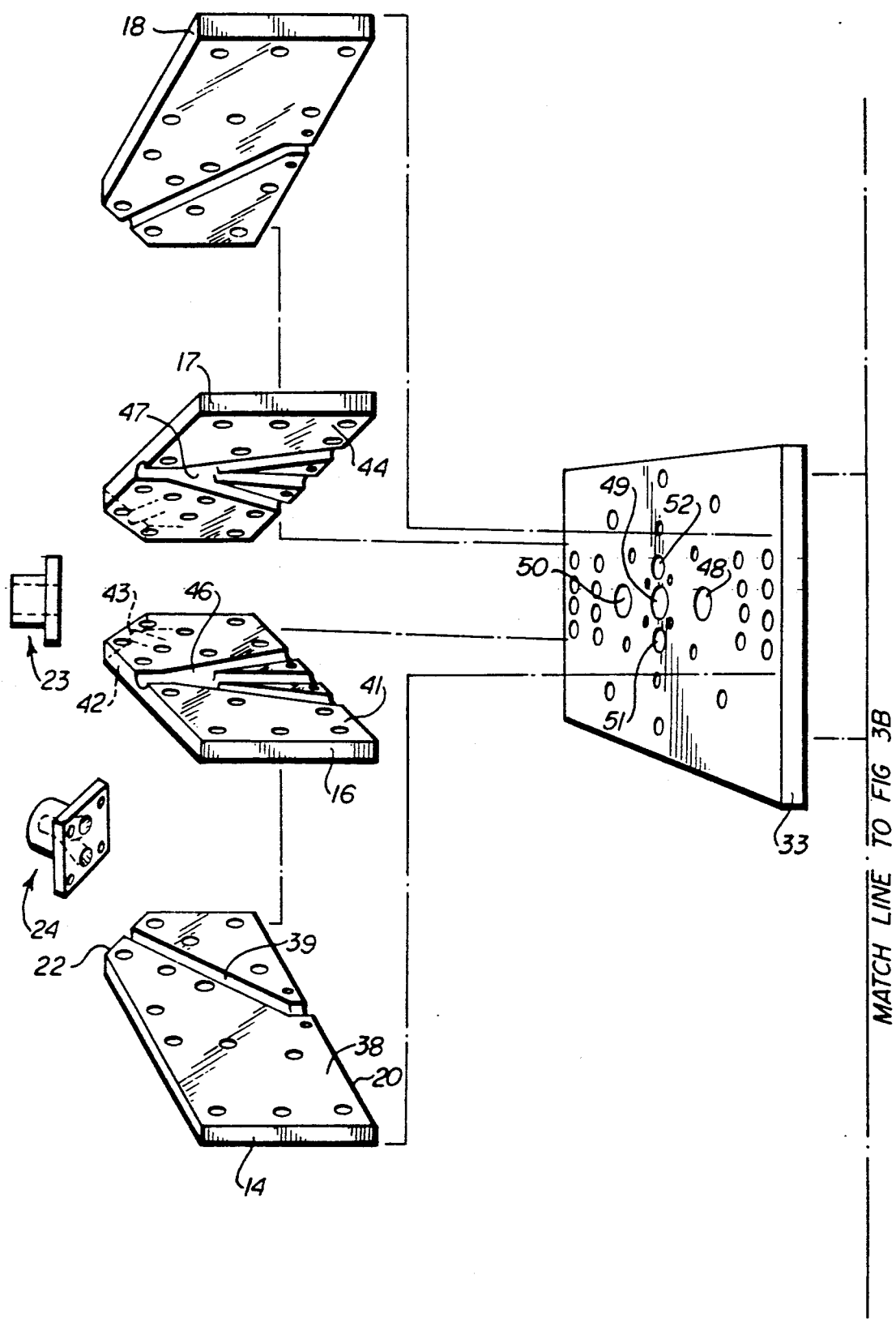
FIG. 3A is an exploded perspective view of the resin distribution manifold of the present invention showing configurations of distribution channels therein.
Figure 3B:
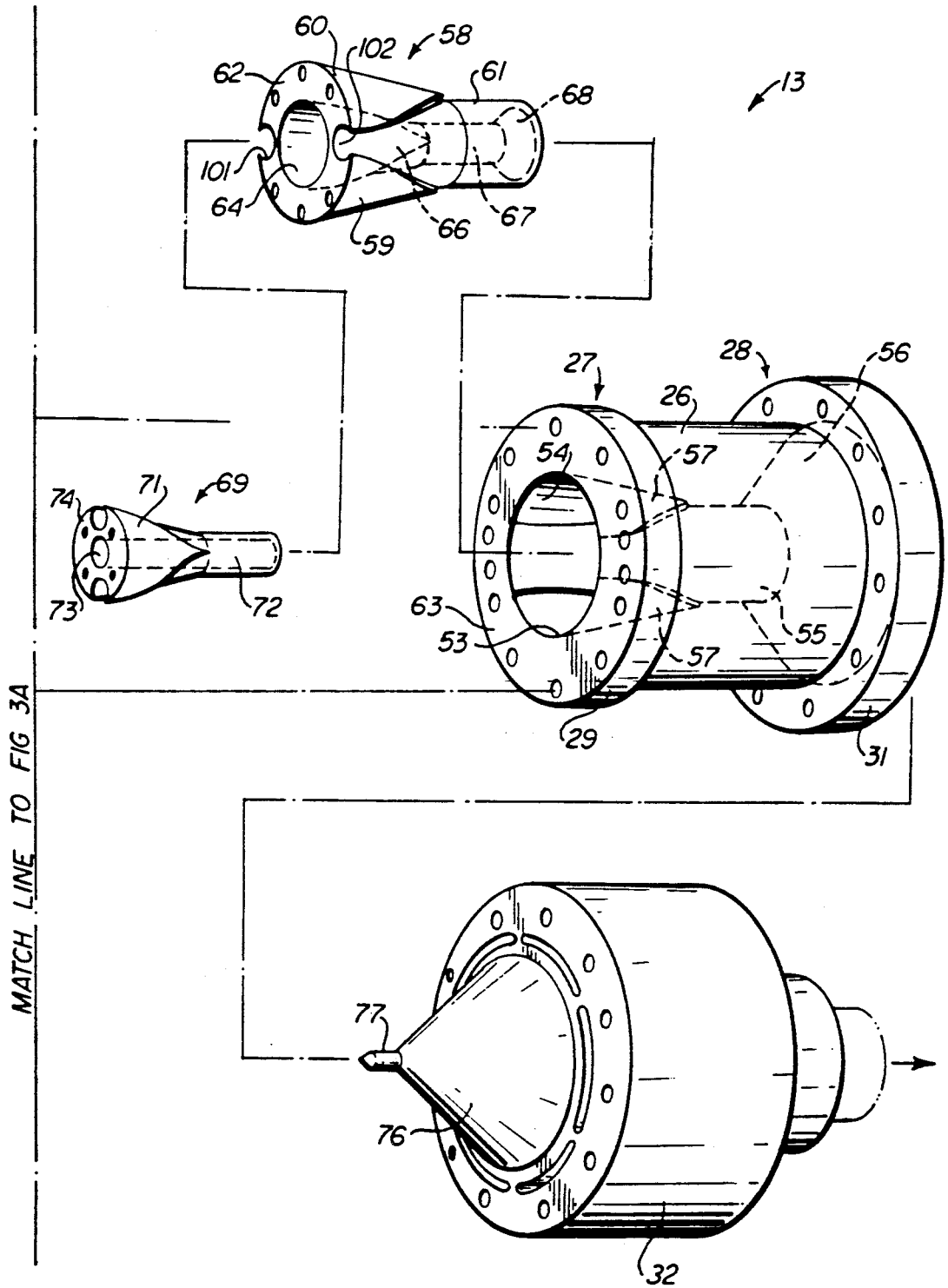
FIG. 3B is a continuation of FIG. 3A illustrating in exploded perspective the coextrusion head of the present invention and showing the nestable relationship of its inserts.

FIGS. 3A and 3B illustrate the assembly of the present invention by means of an exploded perspective view that shows the relationships of the various elements of the apparatus. While ancillary hardware such as nuts and bolts have been omitted from the illustrations of FIGS. 3A and 3B for clarity, it will be understood that such hardware is employed in the conventional way to secure the various elements together as shown in FIGS. 1 and 2 for operation of the coextrusion assembly.

The resin distribution manifold 12 is seen to comprise four overlying metal plates including a lower plate 14, a lower middle plate 16, an upper middle plate 17, and an upper plate 18. The lower plate 14 has an upper face 38 that is formed with a trough that preferably has a semicircular cross section with the trough extending from the oblique face 22 of the plate 14 to the front face 20 thereof as shown. The lower middle plate 16 has an upper face 41 and a lower face 42. The lower face 42 of the plate 16 is formed with a trough 43 that extends from the oblique face of the plate to the front face thereof, has a semi-circular cross section and is positioned to align with the trough 39 of the lower plate 14 when the plates are in an overlying relationship forming the manifold. In this way, the aligned troughs 39 and 43 define a cylindrical channel through the distribution manifold from the lower portion of its side face 22 to the lower middle portion of its front face 20.

Similarly, the upper face 41 of the plate 16 and the lower face 44 of the upper middle plate 17 are formed with matching troughs 46 and 47 respectively that each communicates at one end with the rear face of its respective plate and expands therefrom in a fanned configuration to define three branches of the trough that communicate with the front face of the plate. The troughs 46 and 47 are configured to align when the plates 16 and 17 are secured together in their stacked manifold defining relationship to form a generally cylindrical branching channel that communicates between the front and rear faces of the resin distribution manifold 12.

In the same way, the upper face of plate 17 and the lower face of plate 18 are formed with troughs that align when the plates are stacked to define a cylindrical channel through the manifold that extends in spaced parallel relationship with respect to the channel formed by troughs 39 and 43 and communicates between the upper portion of the manifold's side face 22 and the upper mid portion of its front face 20.

With the just described configuration, it will be understood that when the plates 14 through 18 are secured together in overlying stacked relationship to form the manifold, the respective troughs in opposed faces of adjacent plates define through the manifold a central fanned channel with a single inlet at the rear face of the manifold and three outlets at the front face of the manifold and further define a pair of spaced parallel channels that straddle the central channel and communicate between the top and bottom portions of the oblique face of the manifold and the top and bottom of the mid portion of the front face of the manifold. The extruder adaptor 23 is configured to communicate with and deliver resin to the inlet of the central channel at the rear face of the manifold and the extruder adaptor 24 is configured to communicate with and deliver resin to the inlets of the spaced straddling channels at the side face of the manifold.

The adaptor plate 33 is configured to abut and be secured to the front face 20 of the manifold 12 and is formed with three coaligned bores 48, 49 and 50 that each communicates with a respective one of the three fanned branches of the central channel of the manifold when the plate 33 is secured to the manifold 12. Similarly, a pair of bores 51 and 52 are formed through the plate 33 with each of these bores communicating at the front face of the manifold with a respective one of the spaced straddling channels that communicate between the side and front faces of the manifold. Additional bores for receiving mounting and securing bolts (not shown) are also provided through the adaptor plate 33 for securing the manifold 12, plate 33 and head 13 together as discussed with respect to FIGS. 1 and 2.

FIG. 3B illustrates the extrusion head assembly 13 and its component elements in an exploded perspective view. The head assembly 13 is seen to comprise a generally cylindrical outer body 26 that has an upstream end 27 and a downstream end 28. Annular mounting flanges 29 and 31 are formed in the upstream and downstream ends of the head respectively for securing the head to the plate 33 and distribution manifold 12 at the upstream end of the head and to a conventional sizing die 32 at the downstream end of the head.

The outer body 26 is formed with interior walls 54 that bound and define an elongated hollow chamber 53 that extends through the body 26 from its upstream end 27 to its downstream end 28. The interior walls 54 are shaped to define in the chamber 53 a pair of opposed tapered lobe receiving slots 57 at the upstream end of the body, an axially extending cylindrical portion 55 intermediate the ends of the body, and an expanding cone-shaped portion 56 at the downstream and of the body.

A first insert 58 comprises an elongated body that has upstream and downstream ends corresponding to the upstream and downstream ends of the outer body 26. The first insert 58 is formed with a pair of opposed axially tapered lobes 59 and 60 at its upstream end with the lobes being sized and shaped to be received into and to seat within the tapered slots 57 of the chamber 53. The downstream end of the insert 58 is formed with an axially extending cylindrical shape that is sized to be received within the cylindrical portion 55 of the chamber 53 in spaced concentric relationship with respect to the chamber walls.

The insert 58 is also formed with an elongated hollow chamber 64 that extends through the insert and is shaped with opposed tapered slots 66 at the upstream end of the insert, an axially extending cylindrical portion 67 intermediate the ends of the insert and an expanding cone-shaped portion 68 at the downstream end of the insert.

A second insert 69 is similar to but smaller than the insert 58 and has an elongated body with upstream and downstream ends, opposed tapered lobes 71 at its upstream end and an axially extending cylindrical portion 72 at its downstream end. The lobes 71 of the second insert are sized and configured to be received into and to seat within the opposed tapered slots 66 of the chamber of the first insert 58 such that the cylindrical portion 72 of the second insert is secured in spaced concentric relationship within the cylindrical walls 67 of the chamber 64 of the first insert. The second insert 69 has a rear face 74 and is formed with a cylindrical axially extending chamber 73 that extends through the insert from its upstream end to its downstream end.

With the body 26 and inserts 58 and 69 thus configured, the fist insert is received into the chamber 53 of the body with its lobes 59 and 60 securely seated within the lobe receiving slots 57, its rear face 62 coextensive with the rear face 63 of the body, its cylindrical portion 61 secured in spaced concentric relationship with the walls of the cylindrical portion 55 of the chamber 53 and with its conical expanding wall 68 being coextensive with the conical wall 56 of the body. With the insert 58 thus positioned, its outer surface in conjunction with the inner surface of the chamber 53 define through the head a passageway having inlet ports 101 and 102 from which extend a pair of opposed diverging legs of the passageway that expand about a circumference until they merge into a first axially extending annular portion of the passageway, which extends to the downstream end of the head.

Similarly, the second insert is received within the chamber 64 of the first insert with its lobes 71 seated within slots 66 and its rear face 74 coextensive with rear faces 62 and 63 such that the second insert defines with the walls of the chamber 64 a passageway through the head with inlet ports 103 and 104 and opposed legs that spread from the inlet ports about a circumference until they merge into a second axially extending annular passageway that is inwardly concentric with respect to the first axially extending annular passageway.

The axially extending chamber 73 of the second insert extends along the longitudinal axis of the coextrusion head and communicates between the upstream and downstream ends thereof. As illustrated in FIG. 4, with the first and second inserts securely seated and nested within the body, their conically shaped downstream ends align coextensively to define within the downstream end of the head an inwardly extending conical cavity. The cavity is configured to receive the torpedo 76 of the sizing die in spaced relationship with the walls of the cavity and with the tip 97 of the torpedo extending partially into the axial chamber 72 when the sizing die is mounted to the head. In this way, the walls of the conical cavity in conjunction with the surface of the torpedo 76 define a conically-shaped expanding passageway that extends from the apex of the torpedo to the entry ports of the sizing die 32.

Furthermore, the tip 97 of the torpedo 76 in conjunction with the walls of the downstream end of the chamber 73 define a third axially extending annular passageway that is inwardly concentric with respect to the second and first annular passageways. It can be seen, then, that the three concentric annular passageways of the coextrusion head communicate at their downstream ends with the conically expanding passageway at successively increasing axial positions therealong. Specifically, the third passageway communicates with the conical passageway at its apex, the second at a position further up the passageway and the third at a position still further up the passageway. As detailed below, this configuration functions to move resin flows from each of the annular passageways into confluence for delivery to the sizing die.

FIG. 5 illustrates the flow of synthetic resin through the assembly of the present invention to form coextruded triple-wall conduit. Flows 81 and 82 of a first synthetic resin are advanced along paths that straddle a longitudinal axis 83. More specifically, the flows 81 and 82 are seen to advance along spaced paths that are transversely opposed with respect to the longitudinal axis 83. As these flows enter the passageways formed by the coextrusion head and its nested inserts, the advancing flows are progressively spread into opposed arcuate fanned shapes 84 and 86 that extend about the longitudinal axis 83 until edges of the spreading flows merge at 87 to form a first axially extending annular flow 88.

In a similar way, flows 89 and 91 of a second synthetic resin are advanced along paths that straddle the longitudinal axis 83. As these flows enter their respective passageways defined by the head and nested inserts, they are also progressively spread into arcuate fanned shapes 92 and 93 that extend about the longitudinal axis 83 and that are inwardly positioned relative to the fanned flows 86 and 84. In a preferred embodiment, the opposed fanned flows 92 and 93 are circumferentially oriented at a right angle with respect to the flows 84 and 86. It will be understood, however, that other relative orientations of these flows may also be used with comparable results. The edges of the advancing and expanding flows 92 and 93 ultimately merge to form a second axially extending annular flow 94 that is inwardly concentric relative to the first annular flow 88.

A cylindrical flow 96 of a third synthetic resin is advanced along the longitudinal axis 83 until it is pierced by the tip 97 of the torpedo to shape the flow 96 into a third axially extending annular flow that is inwardly concentric with respect to the first and second flows 88 and 94 respectively. Three axially extending annular and concentric flows are thus formed within the coextrusion head with the flows being advanced together toward the downstream end of the head.

With the advancing concentric annular resin flows thus formed, each moves toward the downstream end of its respective passageway within the coextrusion head and there enters and moves along the conically shaped expanding passageway formed by conical cavity in the end of the head and the surface of the torpedo 76 (FIG. 4). The inner flow 96 enters at the apex of and begins to expand outwardly within the conical passageway until it reaches the position of intersection of the intermediate flow 94 with the passageway. At this position, the intermediate flow 94 enters the conical passageway and moves into confluence with the inner flow therein to form a two-layered flow. The two-layered flow, then, moves further up the conical passageway to the intersection of the first annular flow with the conical passageway where the first flow enters the passageway and moves into confluence with the two-layered flow therein to form a three-layered flow. A three-layered conically expanding resin flow is thus formed which advances further up the conical passageway until it moves into the inlet ports of the sizing die 32, wherein the flow is reduced in thickness and formed into an annular configuration to produce the finished triple wall conduit having walls with an intermediate layer of foamed resin sandwiched between inner and outer layers of resilient, corrosion resistant resin.

The invention has been described in terms of preferred embodiments. It will be understood, however, that various modifications, deletions and additions could be made to the illustrated embodiments without departing from the spirit and scope of the invention as set forth in the claims.

We claim:

1. A method of forming layered wall conduit from flows of malleable synthetic resinous material with said method comprising the steps of:
    (a) advancing at least two flows of a first resinous material along spaced paths that straddle a longitudinal axis;
    (b) progressively spreading the advancing flows of the first resinous material into arcuate fanned shapes that extend about the longitudinal axis until their edges merge with each other to form a first axially extending annular flow;
    (c) advancing at least two flows of a second resinous material along spaced paths that straddle the longitudinal axis;
    (d) progressively spreading the advancing flows of the second resinous material into arcuate fanned shapes that extend about the longitudinal axis until their edges merge with each other to form a second axially extending annular flow that is concentric with the first axially extending annular flow;
    (e) moving the first and second annular flows into confluence with each other to form a layered flow; and
    (f) shaping the layered flow into a layered wall conduit.

2. A method of forming layered wall conduit as claimed in claim 1 and where in step (a) the flows of a first resinous material are advanced along paths that are transversely opposed relative to the longitudinal axis.

3. A method of forming layered wall conduit as claimed in claim 2 and where in step (c) the flows of a second resinous material are advanced along paths that are transversely opposed relative to the longitudinal axis.

4. A method of forming layered wall conduit as claimed in claim 1 and where in step (d) the second axially extending annular flow is inwardly concentric relative to the first axially extending annular flow.

5. A method of forming layered wall conduit as claimed in claim 4 and wherein step (e) includes directing the second axially extending annular flow into and advancing it along a radially expanding passageway and directing the first axially extending annular flow into confluence with the second flow within the radially expanding passageway.

6. A method of forming layered wall conduit as claimed in claim 4 and further comprising the step of advancing a flow of a third resinous material along the longitudinal axis, shaping the advancing flow of a third resinous material into a third axially extending annular flow and bringing the third axially extending annular flow into confluence with the first and second axially extending annular flows to form a three layered flow.

7. A method of forming layered wall conduit as claimed in claim 6 and wherein the first resinous material and the third resinous material are of the same composition.

8. A method of forming triple-wall conduit from flows of malleable synthetic resinous material with said method comprising the steps of:
    (a) advancing a flow of a first resinous material along a longitudinal axis;
    (b) advancing at least two flows of a second resinous material along spaced paths that straddle the advancing flow of the first resinous material;
    (c) progressively spreading the advancing flows of the second resinous material into arcuate fanned shapes until their edges merge to form a first axially extending annular flow that is outwardly concentric with respect to the flow of first resinous material;
    (d) advancing at least two flows of a third resinous material along spaced paths that straddle the advancing flow of the first resinous material;
    (e) progressively spreading the advancing flows of the third resinous material into arcuate fanned shapes until their edges merge to form a second axially extending annular flow that is outwardly concentric with respect to the first axially extending annular flow;
    (f) shaping the flow of first resinous material into a third axially extending annular flow that is inwardly concentric with respect to the second axially extending annular flow;
    (g) moving the flow of second resinous material into confluence with the flow of first resinous material to form a two layered flow;
    (h) moving the flow of third resinous material into confluence with the two layered flow to form a three layered flow with an intermediate layer of the second resinous material sandwiched between inner and outer layers of the first and second resinous material respectively; and (i) shaping the three layered flow into an annular configuration with a predetermined diameter and wall thickness to form the triple-wall conduit.

9. The method of claim 8 wherein the first resinous material and the third resinous material are of the same composition.

10. A coextrusion head for use with a sizing die in the formation of multi-wall conduit from malleable synthetic resin, said coextrusion head comprising:
a body having an upstream end, a downstream end, and a longitudinal axis;
a first passageway formed in said body with said first passageway being coextensive with the longitudinal axis of said body and extending therealong from the upstream end of said body to the downstream end thereof;
a second passageway formed in said body with said second passageway having at least two legs that straddle the first passageway with said two legs expanding progressively about said first passageway in fanned arcuate patterns from the upstream end of the body toward the downstream end thereof;
said expanding legs of said second passageway merging at a predetermined longitudinal position within said body to form an axially extending annular portion of said second passageway that surrounds said first passageway and extends to the downstream end of said body.

11. The coextrusion head of claim 10 and further including means at the downstream end of said body for shaping said first passageway into an axially extending annular configuration that is inwardly concentric with respect to the annular portion of said second passageway.

12. The coextrusion head of claim 11 and further comprising a third passageway formed in said body and having at least two legs that straddle the first passageway and expand thereabout in fanned arcuate patterns from the upstream end of said body toward the downstream end thereof, said legs of said third passageway merging at a predetermined longitudinal position within said body to form an axially extending annular portion of said third passageway that surrounds the annular portion of said second passageway and extends to the downstream end of said body.

13. The coextrusion head of claim 12 and further comprising means for distributing flows of malleable synthetic resinous material under pressure to the upstream ends of said first, second, and third passageways for advancement therethrough.

14. The coextrusion head of claim 13 and wherein said means for distributing flows of resinous material comprises a distribution manifold mounted to the upstream end of said body and formed with internal channels configured to direct a first resinous material from an extruder to the upstream ends of said first and third passageways and to direct a second resinous material from an extruder to the upstream end of said second passageway.

15. The coextrusion head of claim 14 wherein said distribution manifold is formed from a plurality of overlying plates that have troughs configured for mutual alignment to define said internal channels.

16. A method of forming layered wall conduit from flows of malleable synthetic resin with said method comprising the steps of:

(a) advancing a flow of a first resin along a longitudinal axis;

(b) advancing at least two flows of a second resin along paths that straddle the flow of first resin;

(c) progressively spreading the advancing flows of second resin into arcuate fanned shapes that extend about the flow of first resin until the edges of the fanned flows merge to define a first axially extending annular flow that surrounds the flow of first resin;

(d) shaping the advancing flow of first resin into a second axially extending annular flow that is surrounded by the first annular flow;

(e) moving the first advancing annular flow into confluence with the second advancing annular flow to form a layered flow; and (f) shaping the layered flow into a layered wall conduit.

17. The method of claim 16 and further including the step of shaping a flow of a third resin into a third axially extending annular flow that surrounds the second and first annular flows and moving the third annular flow into confluence with the layered flow to form a three-layered flow for shaping into layered wall conduit.

* * * * *